(No Model.)
2 Sheets—Sheet 1.
W. A. BEAN.
CRANK SHAFT FOR BICYCLES.
No. 550,122.
Patented Nov. 19, 1895.
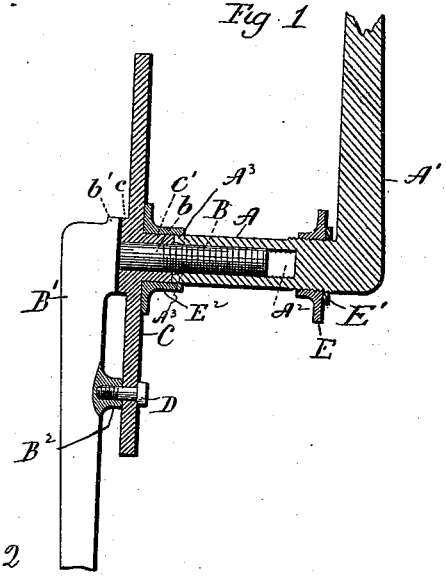
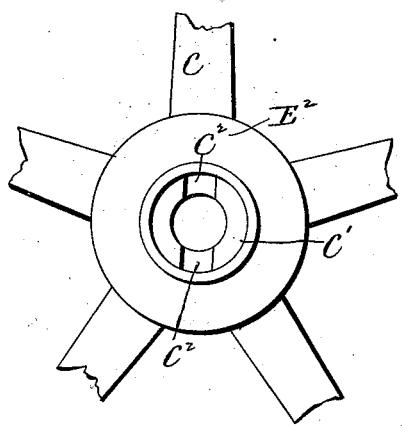
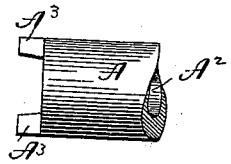
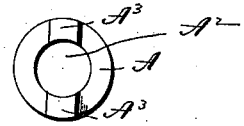
Witnesses
J. H. Shumway
Lillian D. Kelsey
William A. Bean
Inventor
By Attys
Earle Seymour (No Model.)  2 Sheets—Sheet 2.
W. A. BEAN.
CRANK SHAFT FOR BICYCLES.
No. 550,122.  Patented Nov. 19, 1895.
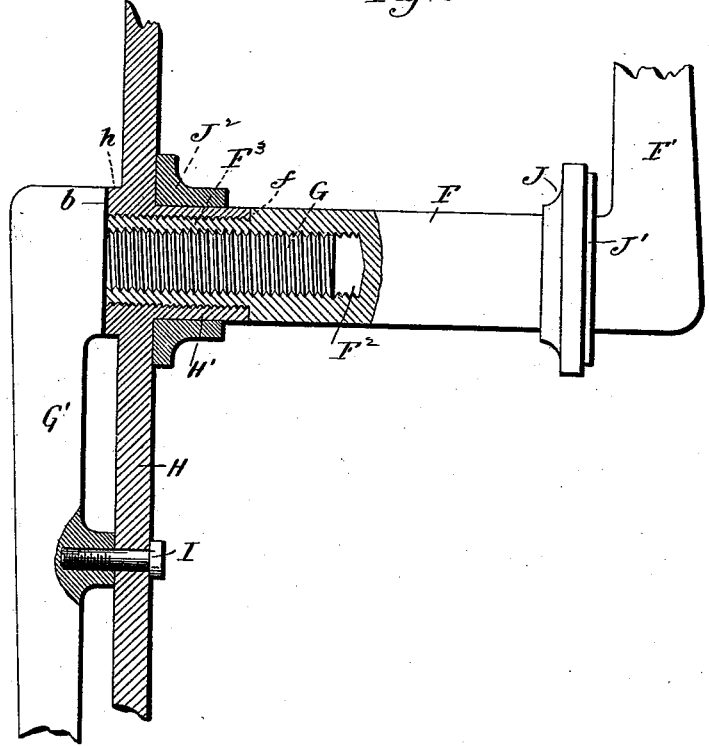

UNITED STATES PATENT OFFICE.

WILLIAM A. BEAN, OF NEW HAVEN, CONNECTICUT, ASSIGNOR TO WILLIAM P. WEAVER, OF SAME PLACE.

CRANK-SHAFT FOR BICYCLES.

SPECIFICATION forming part of Letters Patent No. 550,122, dated November 19, 1895.

Application filed April 8, 1895. Serial No. 544,841. (No model.)

*To all whom it may concern:*

Be it known that I, WILLIAM A. BEAN, of New Haven, in the county of New Haven and State of Connecticut, have invented a new Improvement in Crank-Shafts for Bicycles; and I do hereby declare the following, when taken in connection with the accompanying drawings and the letters of reference marked thereon, to be a full, clear, and exact description of the same, and which said drawings constitute part of this specification, and represent, in—

Figure 1 a view, partly in section and partly in elevation, of one form which a crank-shaft constructed in accordance with my invention may assume; Fig. 2, an enlarged detached view in inside elevation of the sprocket-wheel; Fig. 3, an enlarged broken view of the outer end of the axle; Fig. 4, a view thereof in end elevation; Fig. 5, a sectional view of one of the modified forms which my invention may assume.

My invention relates to an improved crank-shaft for bicycles, the object being to produce a simple, strong, durable, and effective construction composed of few parts, readily assembled and dismembered, and dispensing with the use of pins for coupling the crank-arms with the crank-axle.

With these ends in view my invention consists in certain details of construction and combinations of parts, as will be hereinafter described and pointed out in the claims.

In carrying out my invention, as shown in Figs. 1 to 4, inclusive, of the drawings, I form a tubular axle A integral with the inner end of one of the crank-arms A', though, if preferred, the axle and arm may be made independently of each other and rigidly secured together. The said axle is constructed with an internally-threaded longitudinal bore $A^2$, which receives a long threaded spindle B, formed integral with or secured to the other crank-arm B'. The inner end of the spindle is left unthreaded, as at $b$, for the reception of the sprocket-wheel C, the hub C' of which has a smooth bore fitting over the said unthreaded portion of the spindle, as clearly shown in Fig. 1. The sprocket-wheel is thus interposed between the outer end of the spindle and the inner end of the crank-arm provided with the threaded spindle entering the bore of the axle. An annular shoulder $c$, formed upon the outer face of the sprocket-wheel, abuts against a corresponding shoulder $b'$, formed between the inner end of the crank-shaft C and the crank-arm B'. For the purpose of firmly locking the sprocket-wheel C to the axle A, I form two corresponding oppositely-located locking-notches, Fig. 2, $C^2 C^2$, in the hub C' of the sprocket-wheel, said notches being adapted to receive two correspondingly oppositely-located locking-lugs $A^3$ $A^3$, formed at the outer end of the axle, as shown in Figs. 3 and 4. When the device is assembled, the said lugs enter the said notches and lock the axle and sprocket-wheel together, so far as rotation is concerned. Then, after the parts are assembled, I connect the sprocket-wheel and the crank-arm B' by means of a screw-bolt D, which passes through one arm of the wheel and into an internally-threaded boss $B^2$, formed upon the inner face of the crank-arm B', as shown in Fig. 1. It will thus be seen that when the parts are assembled the two crank-arms, the sprocket-wheel, and the axle are all firmly coupled together, so far as rotation is concerned, and rotate as one piece.

Upon the inner end of the axle I form external screw-threads for the reception of the internally-threaded adjustable cone-bearing E, which is held in place by a washer E', having the function of a jam-nut. A corresponding cone-bearing $E^2$ is mounted rigidly upon the hub C' of the sprocket-wheel, and projects, as shown, slightly beyond the hub, so as to lap over the joint between the same and the outer end of the axle. Although I have shown the cone-bearing $E^2$ as formed independent of and mounted upon the hub C', I may choose to make it integral therewith.

It will be seen from the said figures of the drawings and the foregoing description that my improved device is extremely simple in construction and composed of few parts, and, furthermore, that it may be easily dismembered and reassembled without the use of any other tool than a simple wrench.

My improved construction is rendered particularly advantageous on account of its simplicity and durability, and because it dispenses with the use of crank-pins, which have generally been employed heretofore for coupling the crank-arms with the axle.

Although I have not used the term "crankshaft," it will be apparent that the parts shown and described virtually form that part of a cycle.

In the modified construction shown in Fig. 5 of the drawings, the axle F is made integral with or rigidly secured to the crank-arm F', and constructed with an internally-threaded longitudinal bore $F^2$, which receives the externally-threaded spindle G, which is formed integral with or rigidly secured to the crankarm G', the threads of the bore and spindle being right-hand threads. The outer end of the axle is reduced in diameter to form a sleeve $F^3$, which is externally threaded to receive the internally-threaded hub H of the sprocket-wheel H', the said threads of the sleeve and hub being left-hand threads, and therefore operating in opposition to the right-hand threads of the counterbore of the axle and the spindle. The said hub and sleeve are proportioned in length so that when the parts are assembled the inner end of the hub will abut against the shoulder $f$, formed between the inner end of the sleeve and the outer end of the axle, and so that the shoulder $b$, formed between the inner end of the spindle G and the inner end of the crank-arm G' will abut against the annular shoulder $h$, formed upon the outer face of the sprocket-wheel, and virtually constituting a continuation of the hub thereof. When the parts are assembled, the sprocket-wheel is firmly locked to the axle, on account of the resistance to each other of the oppositely-pitched screw-threads above described.

For the purpose of additionally securing the crank-arm G' to the sprocket-wheel, the same is connected therewith by means of a screw-bolt I. When the parts are thus assembled, they are coupled together against rotation and operate as one piece would operate, but they are also adapted to be readily taken apart and reassembled, requiring neither skill nor the use of any tools beyond a simple wrench for the purpose. Upon the axle I mount an adjustable cone-bearing J, which is locked in place by means of a jam-nut J', while upon the hub H of the sprocket-wheel I mount a corresponding cone-bearing $J^2$, which may be made integral with or mounted upon the said hub. It will be clear, also, that the construction illustrated by Fig. 5 virtually forms the part commonly known as the "crank-shaft" of a cycle.

I may here mention that, although I have spoken of my invention as applied to bicycles, it is equally applicable to tricycles or any machines of the velocipede type.

It is apparent that in carrying out my invention still other changes might be made, and I would have it understood that I do not limit myself to the construction shown and described, but hold myself at liberty to make such changes and alterations as fairly fall within the spirit and scope of my invention.

Having fully described my invention, what I claim as new, and desire to secure by Letters Patent, is—

1. In a crank-shaft, the combination with a crank-arm provided at its inner end with an axle constructed with an internally threaded longitudinal counter-bore, of a crank-arm provided at its inner end with an externally threaded spindle adapted to enter the said counter-bore, a sprocket-wheel interposed between the outer end of the axle and the inner end of the crank-arm provided with the threaded spindle, and coupled with the said axle, means for connecting the said sprocket-wheel and the crank-arm last mentioned to insure their rotation together in either direction, and cone-bearings respectively mounted upon the axle and the hub of the sprocket-wheel, substantially as set forth.

2. In a crank-shaft, the combination with a crank-arm provided at its inner end with an axle having an internally threaded longitudinal counter-bore, of a crank-arm having at its inner end an externally threaded spindle adapted to enter the said counter-bore, a sprocket-wheel interposed between the outer end of the axle and the inner end of the crank-arm provided with the spindle, and furnished with a hub having locking notches receiving locking lugs formed upon the adjacent end of the axle, whereby the sprocket-wheel and axle are coupled against rotation; means for connecting the said sprocket-wheel and the crank-arm last mentioned to insure their rotation together in either direction and cone bearings mounted upon the axle and hub of the sprocket-wheel, substantially as set forth.

In testimony whereof I have signed this specification in the presence of two subscribing witnesses.

WILLIAM A. BEAN.

Witnesses:
WILLIAM A. WRIGHT,
WM. B. BROWN.